United States Patent
Hassan et al.

[19]

[11] Patent Number: 5,812,968
[45] Date of Patent: Sep. 22, 1998

[54] VOCODER APPARATUS USING THE LINK MARGIN

[75] Inventors: Amer A. Hassan; Peter D. Karabinis; Nils Rutger Rydbeck, all of Cary, N.C.

[73] Assignee: Ericsson, Inc., Research Triangle Park, N.C.

[21] Appl. No.: 705,885

[22] Filed: Aug. 28, 1996

[51] Int. Cl.[6] .................................................... G10L 3/02
[52] U.S. Cl. ..................... 704/221; 704/222; 704/223; 704/224; 704/500
[58] Field of Search .................................. 704/500, 504, 704/221, 222, 223, 224

[56] References Cited

U.S. PATENT DOCUMENTS

| | | | |
|---|---|---|---|
| 4,370,524 | 1/1983 | Hiraguri | 704/500 |
| 5,043,676 | 8/1991 | Sato et al. | 704/500 |
| 5,317,567 | 5/1994 | Champion | 704/221 |
| 5,414,796 | 5/1995 | Jacobs et al. | 704/221 |
| 5,457,685 | 10/1995 | Champion | 704/500 |
| 5,528,593 | 6/1996 | English et al. | 370/84 |
| 5,530,750 | 6/1996 | Akagiri | 704/500 |
| 5,657,420 | 8/1997 | Jacobs et al. | 704/223 |

FOREIGN PATENT DOCUMENTS

| | | |
|---|---|---|
| 0 651 531 A | 5/1995 | European Pat. Off. . |
| WO 92/22891 | 12/1990 | WIPO . |

OTHER PUBLICATIONS

Furui, Digital Speech Processing, Synthesis, and Recognition, pp. 76–79, Jan. 1, 1989.

Yuen, E., Et al., "Variable Rate Speech and Channel Coding for Mobile Communication" Proceedings of the Vehicular Technology Conference, Stockholm, Jun. 8–10, 1994, vol. 3, 8 Jun. 1994, Institute of Electrical and Electronics Engineers, pp. 1709–1713, XP000497714.

Nanying, Yin, et al., "A Dynamic Rate Control Mechanism for Integrated Networks", Networking In the Nineties, Bal Harbour, Apr. 7–11, 1991, vol. 2, 7 Apr. 1991, Institute of Electrical and Electronics Engineers, pp. 543–552, XP000223378.

*Primary Examiner*—David R. Hudspeth
*Assistant Examiner*—Susan Wieland
*Attorney, Agent, or Firm*—Jenkens & Gilchrist, P.C.

[57] ABSTRACT

An apparatus for improving the link margin of a communication link includes a variable rate vocoder which decreases the output bit stream rate it produces so as to reduce the amount of information having to be transmit in the communication link. In one embodiment, the variable rate vocoder includes a plurality of vocoder portions, each of which produces a different bit stream rate. The selector is used for selecting among the output bit streams produced by each vocoder. In another embodiment, a logic device is coupled to the output of the vocoder. The logic device, upon receipt of a control signal, truncates the less important bits.

The method for improving link margin includes reducing the vocoder output rate thereby reducing the amount of data being transmit in an communication link. The method also includes using increased error correction coding and transmitting at increased per bit power levels to increase link margin. A device knows to increase the link margin whenever it receives a request to do so, which request is based upon poor signal quality.

26 Claims, 7 Drawing Sheets

VOCODER APPARATUS USING THE LINK MARGIN

FIELD OF THE INVENTION

The invention relates to wireless communications. More specifically, the invention relates to apparatus and methods for increasing the link margin of wireless communications between a transmitting unit and a receiving unit including satellite and earth based wireless communications systems.

DESCRIPTION OF THE RELATED ART

A communication system is formed, at a minimum, of a transmitter and a receiver interconnected by a communication channel. The communication system is operable at least to transmit communication signals, having an informational content, generated at, or applied to, the transmitter. The communication signals are transmitted to the receiver through the communication channel. The receiver is operable to receive the transmitted, communication signal and to recreate the informational content of the communication signal.

A radio communication system is a communication system in which the communication channel is formed of one or more frequency bands of the electromagnetic frequency spectrum. A transmitter operable in a radio communication system generates a communication signal of characteristics permitting its transmission through the communication channel, and the receiver operable in the radio communication system permits reception of the communication signal transmitted through the communication channel.

Typically, the radio receiver includes tuning circuitry tunable to the frequencies of the communication channel through which the communication signal is transmitted, down-conversion circuitry for down-converting a receive signal formed of the communication signal from a transmission frequency into a lower frequency signal, demodulation, and decoder circuitry which permit the informational content of the communication signal to be recreated.

A radio communication system is advantageous for the reason that a fixed, or hard-wired, connection is not required to form the communication channel extending between the transmitter and receiver. Communication can be effectuated between remotely-positioned transmitters and receivers without the need to form the hard-wired or other fixed connections therebetween.

A cellular communication system is a type of radio communication system. When the infrastructure, hereinafter referred to as the network, of the cellular communication system is installed in a geographical area, a subscriber to the cellular system is generally able to communicate telephonically in the system when positioned at any location in the geographical area encompassed by the system.

Cellular communication networks have been installed throughout significant portions of at least many of the world's population centers. Large numbers of subscribers to cellular communication systems formed of such cellular networks are able to communicate telephonically when positioned in areas encompassed by such cellular networks.

However, in some areas, such as areas not proximate to population centers, conventional, i.e., terrestrial, cellular communication networks have not been installed. In areas of low population density, for instance, a terrestrial-cellular communication network might not be commercially viable and is not installed.

The terrestrial-cellular communication networks which have already been installed have also been constructed pursuant to various different standards. A user terminal operable in one of the cellular communication systems is sometimes not operable in others of the cellular communication systems.

Therefore, even in an area in which a cellular communication network has been installed, a user might not be able to communicate by way of the cellular communication network if the user attempts to utilize a user terminal constructed to be operable only with another one of the cellular communication networks.

Satellite-cellular communication systems have been proposed which, when implemented, shall permit a user, utilizing a user terminal operable therein, to communicate telephonically by way of the satellite-cellular communication system when positioned at almost any location. By transmitting down-link and signals between a satellite-based transceiver and the user terminal and up-link signals between the user terminal and the satellite-based transceiver, telephonic communication shall be possible between the user terminal and the satellite-based transceiver. By effectuating additional communication links between the satellite-based transceiver and a ground station, the user of the user terminal shall be able to communicate telephonically with another party by way of the ground station and the satellite-based transceiver.

Numerous technical obstacles must be overcome in order to implement a workable, satellite-cellular communication system. For instance, the user terminal must be capable of transmitting communication signals to a satellite-based transceiver orbiting the Earth at a distance of perhaps thousands of kilometers above the Earth's surface.

Also, costs associated with placing the satellite-based transceiver in orbit are quite significant, and the satellite-cellular communication systems are being designed in ways to minimize the number of satellite-based transceivers required of such a system while still providing a worldwide coverage area. Supervisory communications between the satellite-based transceiver and a user terminal should therefore be minimized.

When a call is to be placed to a user terminal, for instance, supervisory communication signals are first transmitted to the user terminal. The user terminal must be informed of the call placement so that, inter alia, the user terminal can be tuned to a proper communication channel to receive and to transmit communication signals pursuant to the call.

To initiate the communications, a network station, either the satellite-based transceiver, or in a terrestrial-cellular communication system, a base station, transmits a paging signal to the user terminal. Repeated transmission of a paging signal might unnecessarily occur if the network station fails to receive timely indications of reception by the user terminal of the paging signal.

The paging signal, as well as subsequent voice signals, or traffic, must be of a "margin" great enough for the user terminal to detect the signal. The "link" margin of the signal is the amount of power of the signal available to a receiver over a nominal level that permits adequate detection by the receiver of the signal over Gaussian noise levels. The margin of a signal can be increased by increasing its power level, by encoding the signal, and by repeating the signal. An acknowledgment signal can be generated by the user terminal to acknowledge its receipt of the paging signal. Analogous to the margin required of the paging signal, the acknowledgment signal must be of a link margin great enough for the network station to detect the signal.

As the user terminal is of a limited power capacity, the power level of an acknowledgment signal transmitted by the user terminal to the network station cannot be increased indiscriminately to increase the link margin of the acknowledgment signal. Therefore, when the communications must be effectuated upon a transmission channel exhibiting a high level of attenuation, the acknowledgment signal might not be able to be adequately communicated to the network station.

Similarly, a need to increase the link margin may arise during an established phone call. By way of example, a mobile station may be within a vehicle passing under a row of trees, which trees are increasing the amount of signal path interference, and therefore the amount of link margin necessary to maintain the call.

In satellite based cellular communication systems which include communication between hand held mobile stations and satellites, the available link margin, or power sufficient to overcome signal blocking conditions, is often insufficient to support the same level of voice quality and user freedom available in cellular terrestrial systems. Moreover, there is often sufficient signal path interference to cause calls to be dropped. Accordingly, there is a continuing need to develop apparatus and methods to increase the link margin, when necessary, to maintain a call between a satellite and an earth based communication device and to improve quality of the signals being received.

Link margin is defined as the difference between the signal-to-noise ratio available at the receiver and the signal-to-noise ratio needed at the receiver in an additive white Gaussian channel. A typical received signal-to-noise ratio is 11 dB. Desired bit error rates of 4% or less can be achieved in a mobile satellite system with a signal-to-noise ratio of 2 dB in a white Gaussian channel. If, by way of example, a typical received signal-to-noise ratio is 11 dB, then the system described has a link margin of 9 dB.

The importance of link margin is that it reflects a system's ability to tolerate signal path interference from environmental conditions such as multipath fading, shadowing due to the head, path blocking from trees, and penetration through glass windows. Because these types of environmental conditions are common to many mobile stations as the stations are being used, their effect upon system performance is critical. By way of example, 4 dB of loss could occur from the fading while 3 dB could occur for head shadowing and 2 dB of loss could result from light shadowing. Because the total loss from these environmental conditions equal the amount of link margin for the system described herein this example, the call would not be dropped. As another example, however, the mobile station could not be used inside a tinted glass enclosure because tinted glass is known to cause a loss of 10 dB while the available link margin in this example, is only 9 dB. Accordingly, the call would be dropped.

When the available link margin, as in this example, is 9 dB, then an increase in the link margin of 1 dB would prevent the call from being dropped. There is a need therefore, for an apparatus and a method of increasing link margin in a communication link between a satellite and a ground based unit, such as a mobile station, that could be used to avoid the unfortunate circumstance of a call being dropped because the available link margin is slightly too low.

It is in light of this background information related to communications pursuant to a radio-telephonic communication system, such as a satellite-based or terrestrial-based cellular communication system, that the significant improvements of the present invention have evolved.

SUMMARY OF THE INVENTION

An apparatus and a method are provided for increasing the link margin for a communication signal between a satellite based transceiver ("satellite") and a ground based communication device such as an earth station ("ES") or such as a mobile station ("MS").

To facilitate communication in those situations where unusual amounts of attenuation are being experienced, the "link" margin of the communication signals is increased to better distinguish the communication signal over background noise. As the power level of a user terminal is limited and cannot normally be increased, the link margin of the communication signal cannot be increased for the uplink by increasing the mobile station's transmission power level. Instead, by encoding the communication signal according to a selected encoding technique, the link margin of the communication signal is increased.

The link margin may also be increased by decreasing the data rate being transmitted by the vocoder which performs the previously discussed coding. In one embodiment, the output bit stream data rate from a vocoder system is decreased by the selective choosing of bit stream outputs among several vocoder units, each of which produces different bit stream rates relative to each other. In this embodiment, each of the vocoder unit inputs are tied to a line carrying a digitized waveform. Each of the vocoder outputs are coupled to a switch capable of selecting one of the vocoder outputs for transmission by a transmitter to a satellite based transceiver. In another embodiment, a vocoder unit is serially coupled to a logic device which selectively truncates less important bits of information to reduce the overall bit stream rate being output to a transmitter for transmission to a satellite based transceiver.

In a down link from the satellite to the earth based communications, or in the uplink from an earth station to the satellite, the link margin may be increased by increasing the power level of the communication link needing an increased link margin to overcome signal path interference. To increase the power within a communication link in a communication device other than a mobile station however, power can be redistributed from one communication link to another. By way of example, a satellite having capability to transceive and communicate with 2000 ground based mobile stations is limited in overall power that it can transmit to the mobile stations. However, it appears that some of the mobile stations are receiving transmissions from the satellite clearly and that communications could continue at slightly reduced power levels, then the slight amount of power reduced from the transmission to one mobile station could be used to increase the link margin for the mobile station suffering from signal path interference. If a slight amount of power is taken, therefore, from the transmissions of at least some of the mobile stations that seem to have ample link margins, the power may be cumulated used for the transmission to the one mobile station needing to have its link margin increased. In this manner, then, the link margin can be increased to overcome the signal path interference.

A method of increasing the link margin in a communication link includes transmitting from a receiving unit to a transmitting unit, a signal reflecting that the transmitting unit needs to increase the link margin. The transmitting unit, upon receiving the signal requesting an increase in link margin, responds by performing a series of steps to increase the link margin. One step is to increase the error coding performed in the compression of the digitized voice signals. Another step is to increase, if possible, the power being used for the transmission to communication signals to the device requesting an increase in the link margin. A third step is to decrease the vocoder bit stream data rate so as to increase the period, and therefore the power, of the individual units of information being transmitted from a transmitter. Each of these steps for increasing the link margin may be performed in any order or combination.

A communication device includes a plurality of vocoders, each operating at a specified sample frequency different from the other of the plurality of vocoders. The communication device, therefore, is capable of selecting among the plurality of vocoders to provide the link margin necessary to maintain the call. The plurality of vocoders are coupled to receive a signal indicating whether the link margin can be decreased, increased, or allowed to remain the same. Another communication device includes one vocoder coupled to a logic device for truncating the least or less important data bits to effectively reduce the output data rate from the vocoder. For each of these communication devices, the vocoder data output rate is controlled by a logic device to increase or decrease the link margin of the communication link as necessary.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
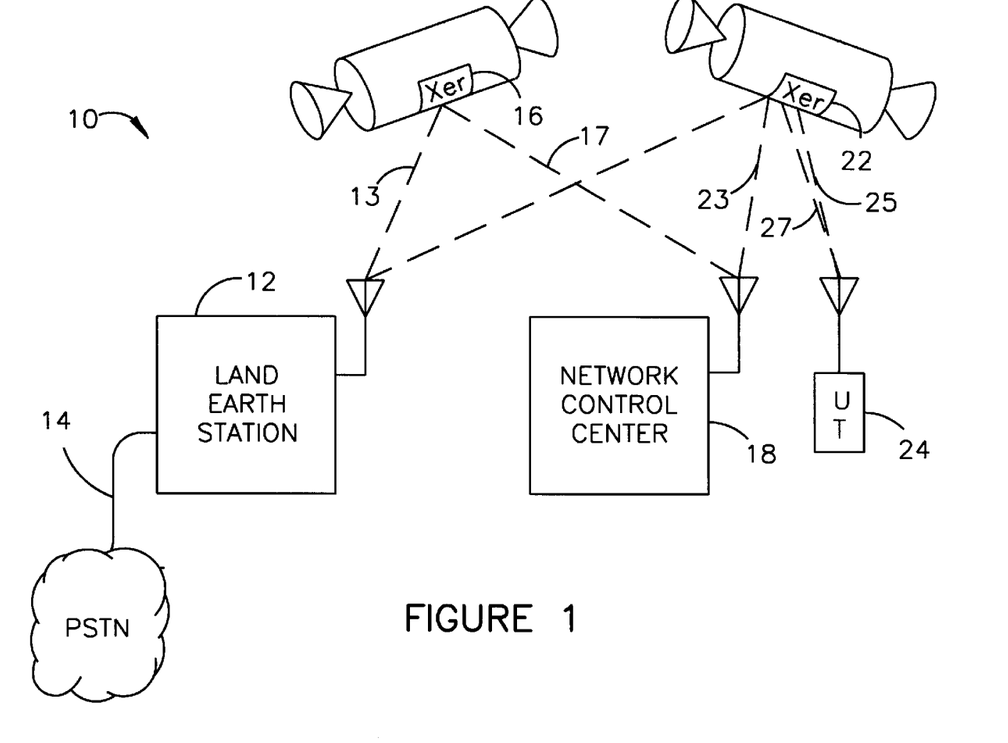
FIG. 1 illustrates a functional block diagram of a satellite-cellular communication system which embodies the circuitry and method of an embodiment of the present invention.

Referring first to FIG. 1, a satellite-cellular communication system, shown generally at 10, includes the circuitry, and associated methodology, of an embodiment of the present invention. It should be noted at the outset that, while the communication system 10 is illustrated to be a satellite-cellular communication system, the present invention can analogously be embodied in a terrestrial-cellular, or other radiotelephonic, communication system. For instance, as one skilled in the art shall appreciate, by appropriate substitution of terrestrial-based base stations for certain of the satellite-based transceivers of a satellite-cellular communication system, a terrestrial-cellular communication system can instead be formed.

The communication system 10 includes a land Earth station 12 which is coupled, here represented by lines 14, to a public service telephone network ("PSTN"). The land Earth station 12 includes transceiver circuitry for transceiving communication signals, inter alia, with a satellite-based transceiver 16 over a communication link 13.

The satellite-based transceiver 16 is operable to transceive communication signals not only with the land Earth station 12 but also with other land-based devices, such as transceiver circuitry of a network control center 18. The transceiver 16 is primarily operable to relay signals generated at the land Earth station 12 to the network control center 18 over a communication link 17 and vice-versa. The transceiver is preferably able to receive signals on any frequency channel and relay the signal on another frequency channel.

The transceiver circuitry of the network control center 18, in turn, is able to transceive communication signals with other satellite-based transceivers, such as the transceiver 22 over communication link 23. The transceiver 22, similar to the transceiver 16, is able to transceive communication signals with land-based transceivers including, for example, to a user terminal 24 over a communication link 25. Analogous to the transceiver 16, the transceiver 22 is primarily operable as a relay to relay signals transmitted thereto. Thus, user terminal 24 is operable to transmit communication signals over a communication link 27. The transceiver circuitry of the illustrated devices each include a plurality of transceiving elements to permit concurrent communication between large numbers of communication stations.

Communication pursuant to a satellite-cellular communication system, such as the system 10 shown in FIG. 1, permits a user of a user terminal, such as user terminal 24, to communicate telephonically when positioned at any location throughout large areas of the world. As long as the user of the user terminal 24 is positioned to permit transmission and reception of communication signals with a satellite-based transceiver, such as one of the transceivers 16 and 22, the user is able to communicate telephonically with a user of another user terminal or to a telephonic device of a conventional, wireline network. Because of the almost-worldwide scope permitted of a satellite-cellular communication system, the user of the user terminal 24 need not be concerned with the compatibility of the user terminal with a local cellular system. The user is further capable of communicating telephonically in an area which does not otherwise have an installed cellular, or wireline, telephonic network.

For instance, when the land Earth station 12 (i.e., a telephone device coupled thereto) initiates a call to the user terminal 24, an indication of the initiation is provided to the network control center 18 by way of the transceiver 16. The network control center generates control signals, including paging signals, which are provided to the terminal 24 by way of the transceiver 22. Once a call set-up is successfully completed, voice channels between the land Earth station and the user terminal are defined to permit two-way communication between the land Earth station and the user terminal, by way of the transceiver 22.

As mentioned previously, power limitations limit the maximum power levels at which signals generated by a user terminal can be transmitted, significant distances separate satellite-based transceivers and the user terminals, and significant expenses are required to be expended to position the satellite-based transceivers in orbit. Communication systems that are being developed are being developed in manners which attempt to minimize the bandwidth required to communicate communication signals and to increase the link margin of signals generated by the user terminals operable in such communication systems.

For instance, when a call is to be placed to a user terminal, supervisory and control signals must first be sent to the terminal. Such signals are transmitted, for example, to inform the user terminal of the incoming call and to cause the user terminal to be tuned to transceive communication signals pursuant to such call. Included among the supervisory and control signals transmitted to the user terminal is a paging signal to alert the user terminal of the incoming call. When the user terminal is paged, the user terminal might not be positioned to receive the paging signal. The paging signal must be repeated in such instances so that the user terminal receives the paging signal. If the link margin is increased to deliver the message, the paging signal includes, in one embodiment, a signal specifying that the link margin requires increasing in the return signals, e.g., the acknowledgment signal.

Figure 2:
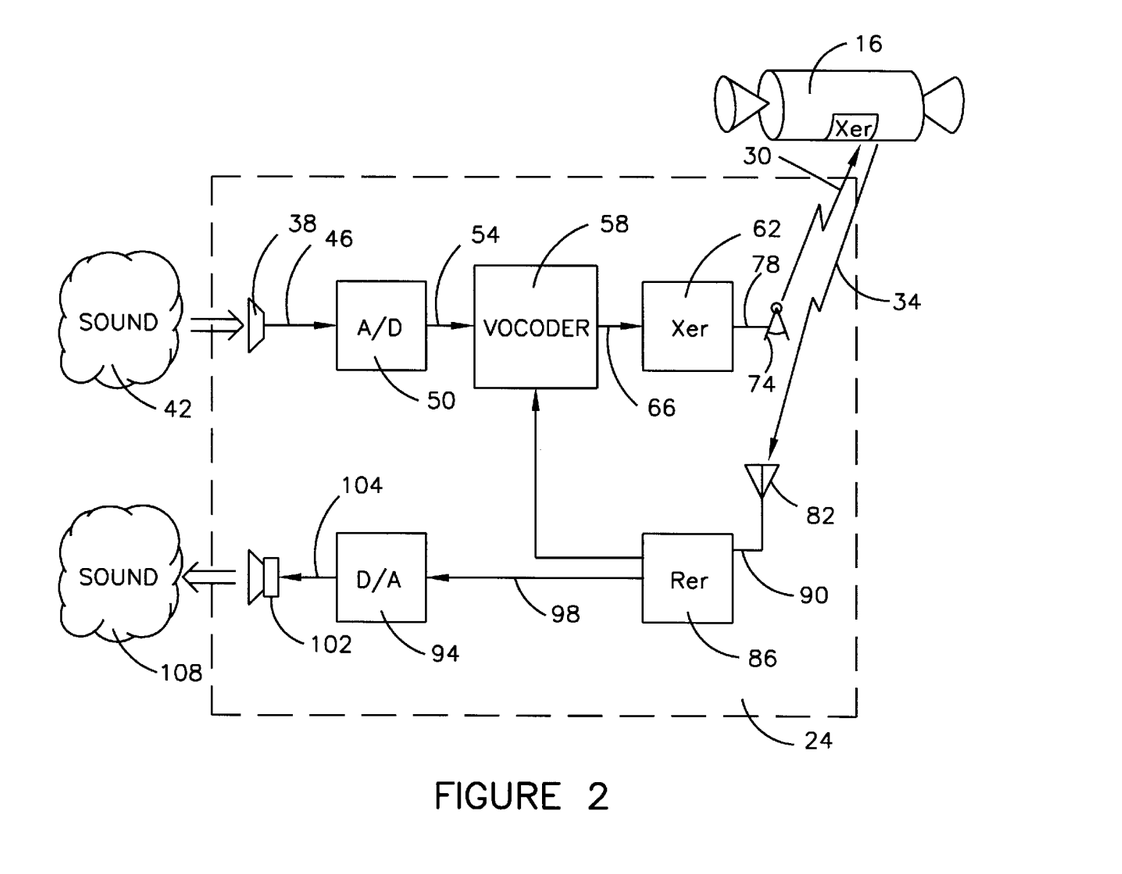
FIG. 2 is a functional block diagram of a user terminal which includes the invention.

Referring now to FIG. 2, there is shown one embodiment of a mobile station which includes a variable rate vocoder. Mobile station ("MS") 24 communicates with a satellite based transceiver 16 via communication up link 30 and communication down link 34. As may be seen, microphone 38 receives a sound 42 and converts sound 42 into an analog signal. Microphone 38 is coupled by line 46 to analog-to-digital converter ("A/D") 50 for converting analog signals into digital signals. A/D converter 50 is coupled by line 54 to vocoder 58, which vocoder 58 produces a coded and compressed signal to transmitter 62 over line 66 for transmission. Vocoder 58 also includes an input port for receiving a control signal from line 70, which control signal causes vocoder 58 to adjust its output bit stream rate in a manner as will be described below.

Transmitter 62 is coupled to antenna 74 by line 78 wherein uplink 30 is a communication link which is transmitted by antenna 74 and is received by transceiver 16. Communication down link 34, in turn, originates at transceiver 16 and terminates at antenna 82. Antenna 82 is coupled to receiver 86 by line 90. As may be seen, receiver 86 produces the control signals for controlling the bit stream rate of vocoder 58, which control signals are transmitted onto line 70 by receiver 86. Receiver 86 also is coupled to transmit digital signals representing sound to digital-to-analog ("D/A") converter 94 over line 98. The digital signals representing sound are signals which were received within down link 34. Finally, D/A 94 is coupled to speaker 102 by line 104. Speaker 102, in turn, converts the analog signals received on line 109 into sound 108.

In operation, sound 42 is received by microphone 38 and is transmitted over line 46 to A/D 50 which, in turn, transmits a digitized signal representing sound 42 over line 54 to variable rate vocoder 58. Variable rate vocoder 58 compresses and encodes the digitized signals to produce an encoded signal which encoded signal is received by transmitter 62 over line 66. Transmitter 62, in turn, manipulates the encoded signals into a transmission format and sends the manipulated encoded signals to antenna 74 over line 78 for transmission to transceiver 16 via uplink 30.

Transceiver 16, in turn, immediately transmits the received signals to antenna 82 over down link 34. Receiver 86 receives over line 90 the signals received from down link 34 at antenna 82. Receiver 86 then manipulates the signals to produce a signal which represents the sound content of the signals in down link 34 and transmits the signal to D/A 94 which converts the signals to an analog form for producing sound by speaker 102.

Continuing to examine FIG. 2, receiver 86 determines if the transceiver 16 has indicated that the quality of the signals being received in transceiver 16 from uplink 30 are of a quality level below a specified threshold. If the link margin is too low in uplink 30, as evidenced by the signal quality, transceiver 16 sends a specified signal in downlink 34 to receiver 86 indicating low link margin. After receiver 86 receives a signal indication low link margin in uplink 30, receiver 86 sends a control signal over line 70 to variable rate vocoder 58 to cause vocoder 58 to reduce the output bit stream rate and, therefore, to increase the link margin of the signal being transmit from antenna 74 to transceiver 16 over up link 30. The specified signal is for specifying that the link margin of the up link must be increased to increase the signal quality.

Figure 3A:
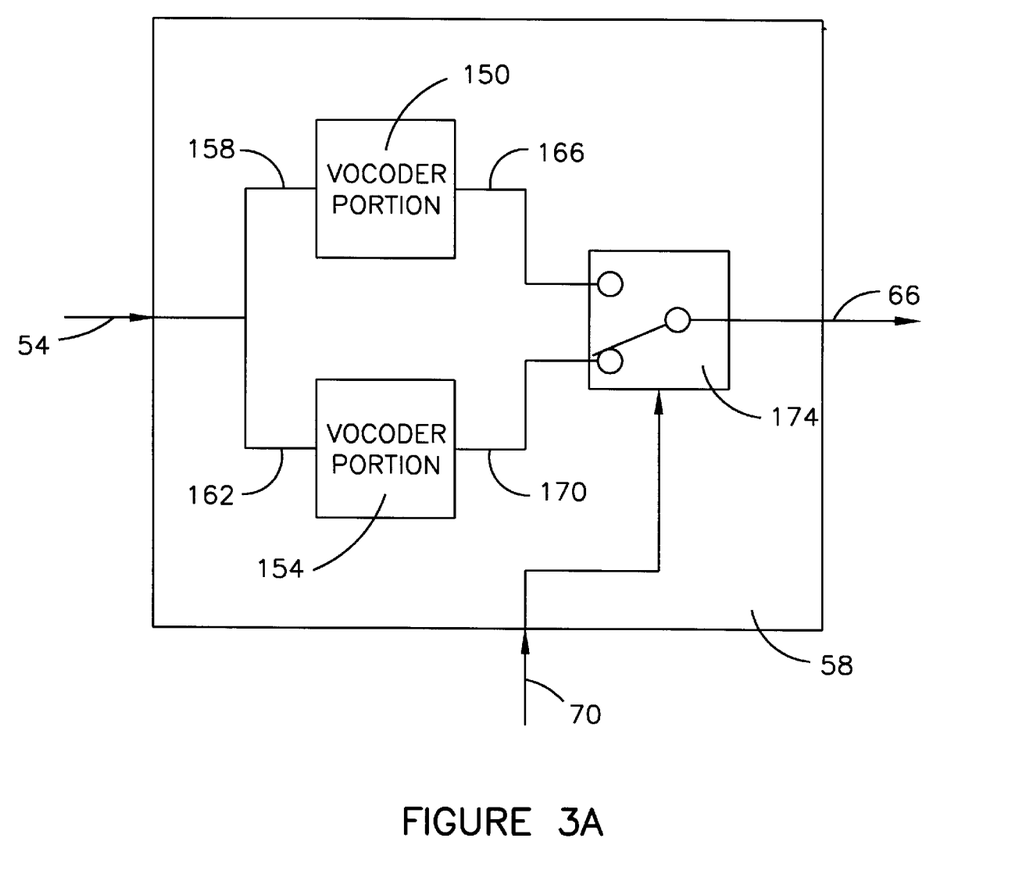
FIG. 3A is a functional block diagram representing a first embodiment of a variable rate vocoder.

Referring now to FIG. 3A, there is shown a first embodiment of the variable rate vocoder 58 of FIG. 2. As may be seen, variable rate vocoder 58 includes an input terminal connected to line 54 for receiving digitized sound from an A/D converter and an output terminal for producing an encoded bit stream on line 66. Additionally, vocoder 58 includes a control input coupled to line 70 for receiving control signals from a receiver. Vocoder 58 includes two vocoder portions namely, vocoder portion 150 and vocoder portion 154. Vocoder portion 150 and vocoder portion 154 each include an input terminal coupled to lines 158 and 162, which, in turn, are coupled to the input terminal of vocoder 58. As may be seen, therefore, a digitized sound stream is received by both vocoder portions 150 and 154. Each of the vocoder portions 150 and 154 are operable to produce output bit streams of different rates on lines 166 and 170, respectively. The output bit streams on lines 166 and 170 are inputs to selector 174, which selector 174 includes an output coupled to line 66. Selector 174 further includes an input terminal for receiving control signals from line 70. As may be seen, the control signals received by vocoder 58 at line 70 cause selector 174 to select between the bit streams produced by vocoder portion 150 and vocoder portion 154, which selected input stream is output on line 66. Accordingly, vocoder 58 operates to improve or increase the link margin of a transmission by selecting the vocoder portion 150 or 154 which is outputting a lower bit stream data rate.

Figure 3B:
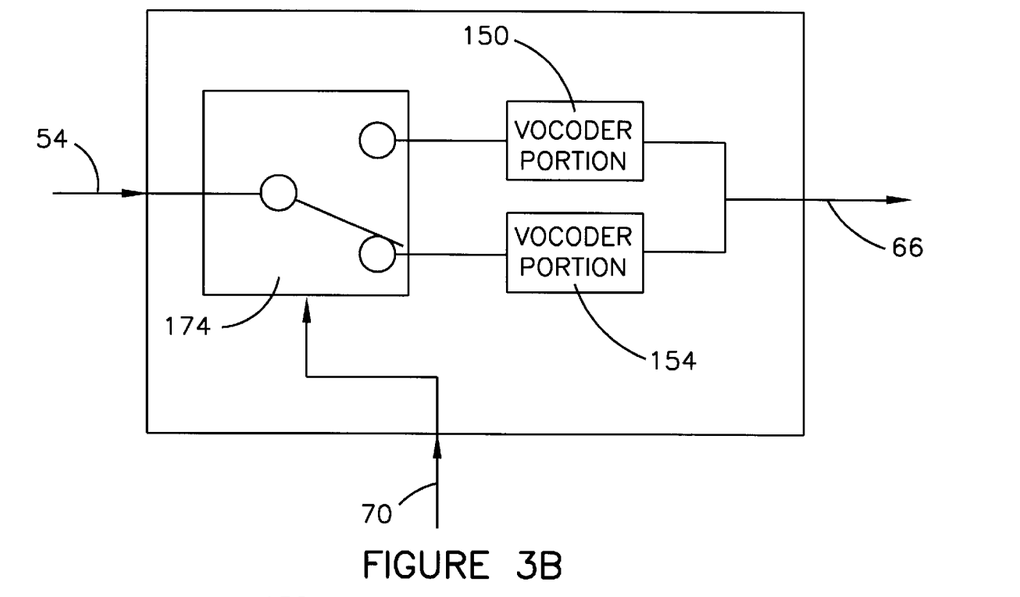
FIG. 3B is a functional block diagram representing a second embodiment of a variable rate vocoder.

Referring now to FIG. 3B, there is shown a second embodiment of the invention. A digitized data stream is received from line 54 at an input terminal of selector 174. A first output terminal of selector 174 is coupled to the input terminal of vocoder portion 150. A second output terminal of selector 174 is coupled to an input terminal of vocoder portion 154. Selector 174 further includes a control input signal line coupled to receive control input signals from line 70. In operation, the state of the control input signal carried on line 70 causes selector 174 to selectively couple the received digitized data stream either to vocoder portion 150 or vocoder portion 154.

Figure 3C:
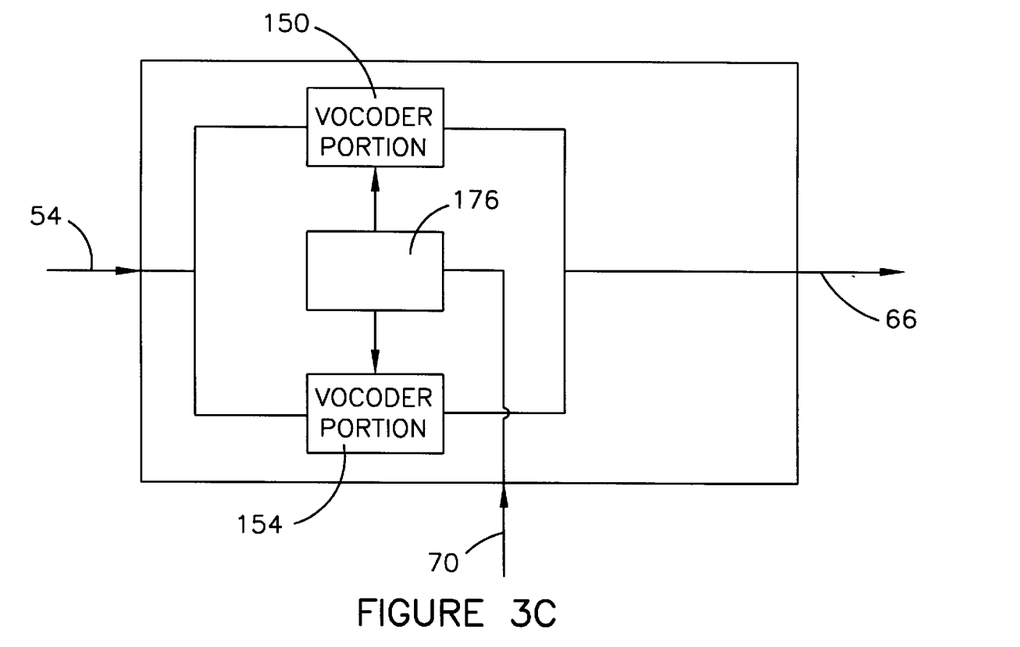
FIG. 3C is a functional block diagram representing a third embodiment of a variable rate vocoder.

Referring now to FIG. 3C, there is shown a third embodiment of the variable rate decoder wherein a digitized data stream is received from line 54 at an input terminal of vocoder portion 150 and at an input terminal of vocoder portion 154. The output terminals of vocoder portions 150 and 154 are both coupled to line 66. Selector 174 further includes a control input signal line coupled to receive control input signals from line 70. In operation, the state of the control input signal carried on line 70 causes selector 174 to selectively couple the received digitized data stream either to vocoder 150 or vocoder 154.

Figure 4A:
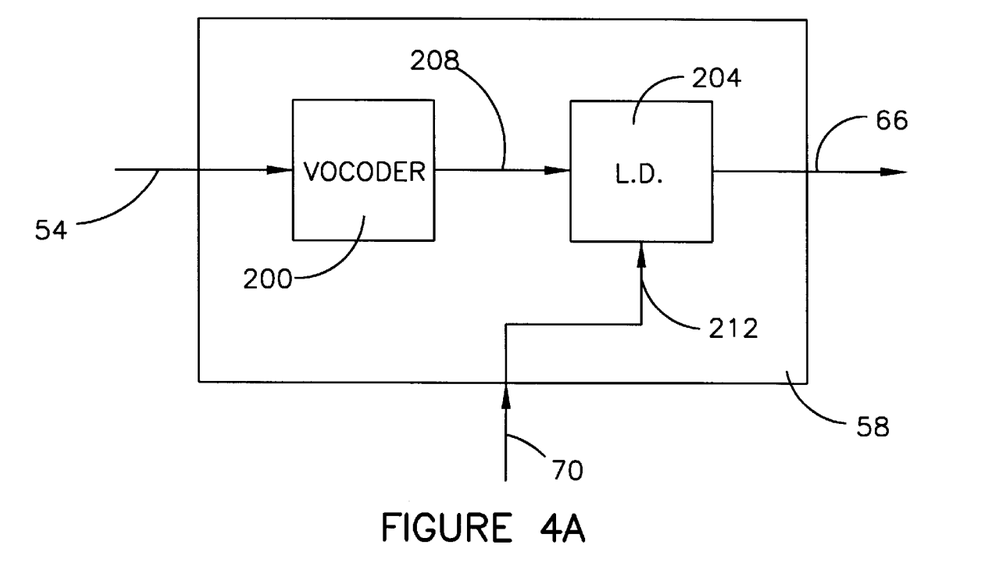
FIG. 4A is a functional block diagram representing a fourth embodiment of a variable rate vocoder.

Referring now to FIG. 4A, there is shown a fourth embodiment of vocoder 58 of FIG. 2. As before, vocoder 58 includes an input terminal coupled to line 54 for receiving digitized sound, an output terminal coupled to line 66 for producing a coded bit stream for transmission by a transmitter (not shown in FIG. 4) and a control input terminal for receiving control signals from line 70. Internally, vocoder 58 includes a vocoder unit 200 and a logic device 204. The input terminal of vocoder unit 200 is coupled to line 54 while the output terminal of vocoder unit 200 is coupled to the input of logic device 204 by line 208. Logic device 204 further includes a control input 212. Logic device 204 operates to truncate the least important bits of the coded bit stream produced by vocoder 208 to effectively reduce the overall bit stream data rate produced at line 66. By way of example, logic device 204 operates to truncate those coded data bits which reflect the very high frequency signals which primarily add tonal quality to a voice transmission. As such, when those high frequency signals are truncated, the signals which carry the voice information which is more important in terms of speech recognition are allowed to pass through.

Logic device 204 determines which signal portions to truncate, as stated above, by keeping those signals which are necessary for adequate speech recognition by a listener once the signal has been converted to an analog form and converted to sound by a speaker. Those signals which represent the high frequency or tonal components of speech may be truncated, when necessary, because the speech or conversation may still be understood without these components.

Figure 4B:
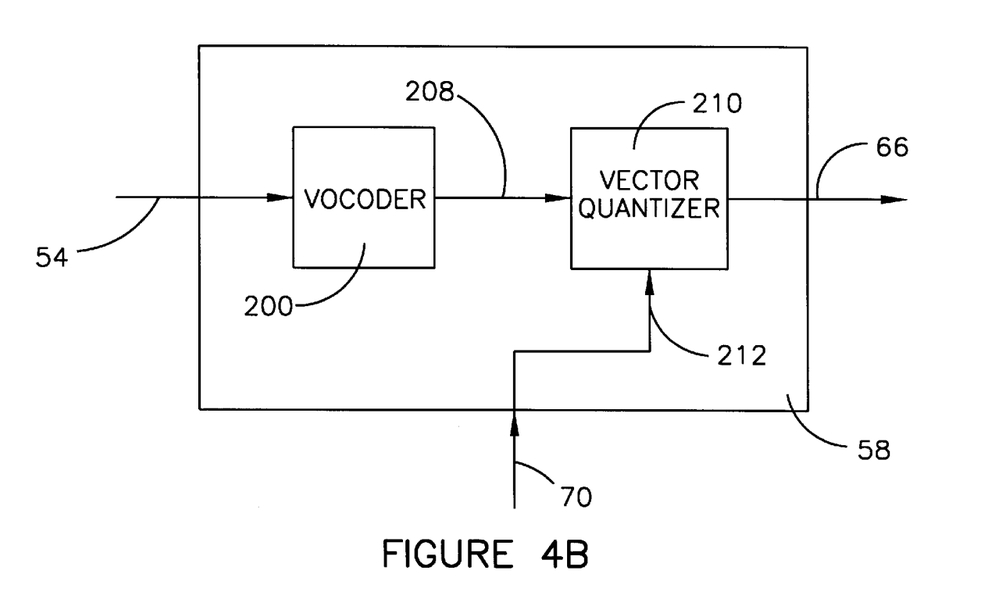
FIG. 4B is a functional block diagram representing a fifth embodiment of a variable rate vocoder.

Referring now to FIG. 4B, there is shown a fifth embodiment of the present invention. Vocoder 58 includes an input terminal coupled to line 54 for receiving digitized sound, an output terminal coupled to line 66 for producing a coded bit stream for transmission by a transmitter (not shown in FIG. 4) and a control input terminal 212 for receiving control signals from line 70. Internally, vocoder 58, again, includes a vocoder unit 200. In the embodiment shown in FIG. 4B, the vocoder 58 also includes a vector quantizer 210. The input terminal of vocoder unit 200 is coupled to line 54 while the output terminal of vocoder unit 200 is coupled to the input of vector quantizer 210 by line 208.

Vector quantizer 210 operates to receive the coded bit stream produced by vocoder 208 and to reduce the overall bit stream data rate produced at line 66 by further compressing the bit stream. By way of example, vector quantizer 210 operates to compress the output bit stream rate of vocoder unit 200 from thirteen kilo bits per second (kbps) to eight kpbs.

Generally, vocoder unit 200 is operable to compress the digitized data it receives in twenty millisecond increments. Accordingly, 20 milliseconds of input data is processed by vocoder unit 200 and an output data rate of 13 kbps is produced therefrom. If, however, the link margin requires further improvement, the overall speech coder rate may be further reduced and the link margin further increased by causing vector quantizer 210 to receive the output of vocoder unit 200 and to further compress the coded data bit stream. To accomplish this task, vector quantizer 210 processes input data in sixty millisecond portions. That is, the input period is tripled from 20 milliseconds to 60 milliseconds. This tripling of the input period allows the vector quantizer 210 to further compress the data without significantly degrading signal quality or the information contained therewithin.

Whether vector quantizer 210 further compresses the output bit stream from vocoder unit 200 or whether it allows it to pass through depends on the logic state of the control signal received from line 70 at control input 212. Whenever the logic control signal received on line 70 is characterized by a first state, vector quantizer 210 performs the additional compression as defined above. Whenever the logic control signal received on line 70 is characterized by a second state, vector quantizer 210 does not perform additional compression and allows the input data bit stream received on line 208 to be output on line 66.

Figure 5:
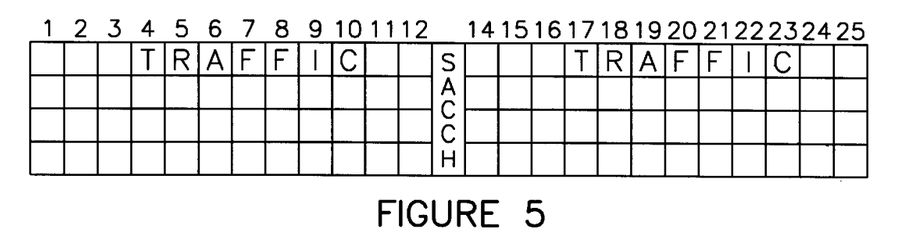
FIG. 5 is a timing diagram representing a communication superframe showing the relationship of a SACCH frame to traffic frames.

Referring now to FIG. 5, a data "superframe" is shown which illustrates the relationship of the Slow Associated Control Channel ("SACCH"). In this embodiment, the SACCH is placed in the 13th data frame. Each of the preceding data frames, namely data frames 1–12, contains 16 traffic slots. The SACCH, therefore, includes 16 slots, one for each of the 16 traffic slots. Among other types of control information relating to each of the 16 traffic slots within the 12 data frames, the SACCH channel includes a signal for specifying that a link margin for a communication link needs to be increased, that the link margin may be decreased, or that the link margin may remain the same. As is known to those skilled in the art, and as may be seen in FIG. 5, the SACCH messages are interleaved over the four traffic slots.

Figure 6:
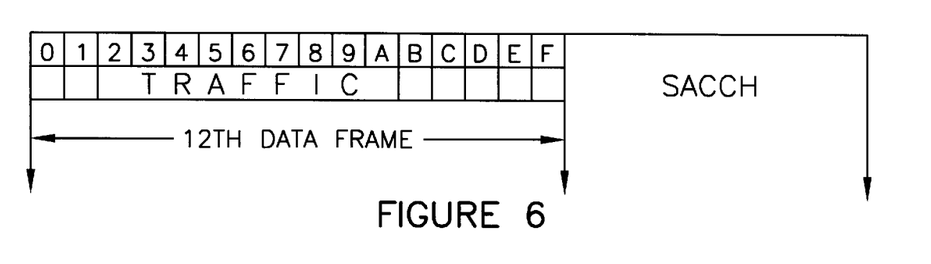
FIG. 6 is a timing diagram representing one embodiment of a 12th data frame.
Figure 7:
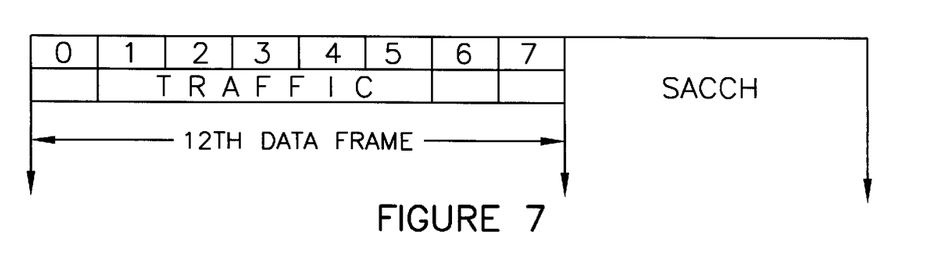
FIG. 7 is a timing diagram representing one embodiment of a 12th data frame.

As has been discussed above, one way of improving link margin is too decrease the amount of compressed and encoded data produced by the vocoder. The reason for reducing the vocoder bit stream rate is to increase the period per bit of information. Referring to the superframe structure of FIG. 5, then, one can observe that the SACCH is placed every 13th data frame. Referring now to the frame structure of FIG. 6, there is shown the 12th data frame, which 12th data frame is transmitted just prior to the SACCH. As may be seen, the data frame includes 16 traffic frames labeled 0-F. Comparing the frame of FIG. 7, however, only 8 traffic frames are shown to exist for the 12th data frame. As is apparent, the frame structure of FIG. 6 carries twice as many data bits as the frame structure of FIG. 7. Because the frame structure of FIG. 7 only carries one half the number of bits as compared to the frame structure of FIG. 6, it follows that the period of each of the bits is doubled. Accordingly, the power per bit has been equally increased and the overall link margin of the signal transmission has been increased. By way of example, the frame structure of FIG. 6 could correspond to the transmission of transmitter 62 of the output of vocoder unit 150 while frame structure of FIG. 7 could represent the transmission of transmitter 62 for the output of vocoder unit 154, all of FIG. 2. It should be noted that the relative differences in data rates of the frames of FIGS. 6 and 7 are exaggerated for illustrative purposes. In actuality, the differences in data rate are not necessarily so large although these differences are actually possible.

Figure 8:
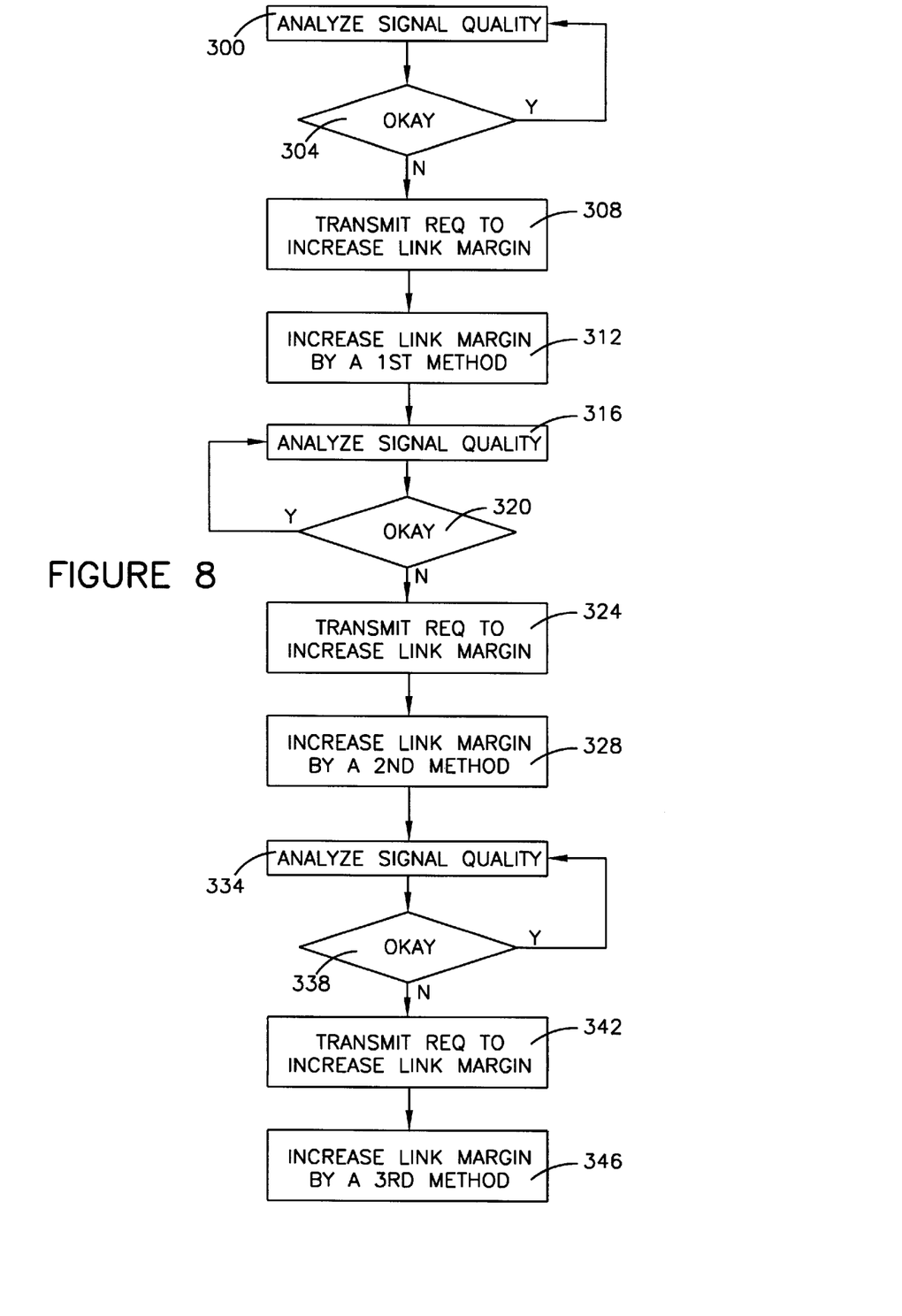
FIG. 8 is a logic flow diagram illustrating one embodiment of the inventive method for improving link margin in a communication link.

Referring now to FIG. 8, there is shown a method for improving link margin. Link margin requires increasing whenever signal quality exceeds a certain tolerance. For example, signal error may be quantified in terms of bit error rates. Commonly, it is a design goal to have a bit error rate which is equal to or less than four percent. Accordingly, signal quality may be measured in terms of whether the bit error rate of four percent has been exceeded. Once a system determines that a bit error in excess of 4% has been realized, then the system may determine that signal quality needs to be improved. In such an example, the system may improve the signal quality by increasing the link margin. Accordingly, the method includes initially analyzing signal quality (step 300). The system then determines whether the signal quality is satisfactory (step 304). If it is satisfactory, the system continues to merely analyze signal quality and determine if it is satisfactory (steps 300 and 304). If the signal quality is not satisfactory, however, a receiving system transmits a request to increase the link margin to the transmitting system (step 308). The transmitting system then increases the link margin by a first method (step 312).

To increase the link margin, at least three different methods are available. As has been discussed heretofore, the link margin may be increased by increasing the amount of power per data bit, by increasing the amount of error correction coding performed for the data transmitted within the communication link, and by reducing the bit stream data rate transmitted within the communication link. These methods for improving link margin may be performed in any order.

Once the first method to increase the link margin has been employed, as determined by a received signal or, after a sufficient amount of time has passed for the link margin to be increased by the first method, the signal quality is analyzed again (step 316). So long as the signal quality is satisfactory, the signal quality continues to be analyzed without further action (steps 316 and 320). If it is determined that the signal quality is not satisfactory (step 320), then a request to increase the link margin is transmitted again (step 324). Thereafter, the link margin is increased by a second method.

The second method of increasing the link margin is any one of the three methods detailed above so long as the method has not already been used to increase the link margin in a previous step. Thereafter, the signal quality is analyzed again (step 334). The signal quality is analyzed, as before, either once a signal has been received indicating that a second method to increase the link margin has been performed or when a sufficient amount of time for a second method to be implemented has transpired. After the signal quality has been analyzed, the system determines whether it is satisfactory (step 338). If it is satisfactory, the system continues to analyze signal quality indefinitely (steps 334 and 338). If it is determined that the signal quality is not satisfactory, then a request to increase the link margin by a third method is performed (step 342). As before, the third method can be any one of the three methods which has not been performed in any of the preceding steps. Thereafter, the link margin is increased by the third method (step 346).

The previous descriptions are of preferred examples for implementing the invention, and the scope of the invention should not necessarily be limited by this description. The scope of the present invention is defined by the following claims.

What is claimed is:

1. Circuitry in a communication device, comprising:
   a vocoder portion having an input terminal coupled to receive a digitized coded bit stream and an output terminal for outputting a coded bit stream; and
   a logic device having an input terminal coupled to receive the coded bit stream and a control input terminal for receiving a control signal, the logic device for increasing a link margin of the communication device by producing a truncated coded bit stream whenever the control signal includes a value which specifies that the received coded bit stream should be shortened so as to reduce a data rate of the coded bit stream.

2. Circuitry for a communication device, comprising:
   a vocoder portion having an input terminal coupled to receive a digitized bit stream and an output terminal, said vocoder for generating, and for outputting at the output terminal thereof, a coded and compressed bit stream, the digitized bit stream having a first input period of time; and
   a compression device having an input terminal coupled to receive the coded and compressed bit stream generated by said vocoder portion and a control input terminal for receiving a control signal for increasing a link margin associated with the communications device by compressing the coded and compressed bit stream to a reduced data rate at a second input period of time, the second input period of time being larger than the first input period of time.

3. The circuitry of claim 2 wherein the second input period of time is an approximate multiple of the first input period of time.

4. The circuitry of claim 3 wherein the second input period of time is at least three time greater than the first input period of time.

5. A communication device, comprising:
   an input for receiving a digitized data stream;
   first circuitry for encoding the digitized data stream to an encoded bit stream;
   second circuitry for increasing a link margin associated with the communications device by decreasing a data rate of the encoded bit stream; and
   an output for providing the encoded bit stream having a decreased data rate.

6. The communication device of claim 5, wherein the first circuitry comprises:
   circuitry for encoding the digitized data stream to provide the encoded bit stream.

7. The communication device of claim 6, wherein the second circuitry comprises:
   circuitry for truncating least important bits from the encoded bit stream to generate the encoded bit stream at the decreased data rate.

8. The communication device of claim 7, wherein the circuitry for truncating is responsive to an external control signal.

9. The communication device of claim 6, wherein the second circuitry comprises:
   a vector quantizer for compressing the encoded bit stream at a first data rate to produce the encoded bit stream at the decreased data rate.

10. The communication device of claim 7, wherein the vector quantizer is responsive to an external control signal.

11. The communication device of claim 5, wherein the least important bits comprise data bits representing very high frequency signals.

12. The communication device of claim 5, wherein the digitized data stream comprises digitized voice data.

13. The communication device of claim 5, wherein the first circuitry comprises:
   first vocoder circuitry for encoding the digitized data stream at a first data rate to generate a first encoded bit stream; and
   second vocoder circuitry for encoding the digitized data stream at a second data rate to generate a second encoded bit stream.

14. The communications device of claim 13, wherein the second circuitry comprises:

a selector connected to receive both the first encoded bit stream at the first data rate and the second encoded bit stream at the second data rate for selecting the encoded bit stream having the lowest data rate.

15. The communication device of claim 14, wherein the selector is responsive to an external control signal.

16. The communications device of claim 13, wherein the second circuitry comprises a selector connected to receive the digitized data stream and selectively provide the received digitized data stream to the vocoder circuitry providing a lowest data rate.

17. The communications device of claim 13, wherein the second circuitry comprises means connected between the first and second vocoder circuitry for selectively coupling the received digitized data stream to the vocoder circuitry providing the lowest data rate.

18. A vocoder, comprising:

an input for receiving a digitized voice data stream;

circuitry for encoding the digitized voice data stream to provide a first encoded bit stream at a first data rate;

means for increasing a link margin associated with the vocoder by truncating least important bits from the first encoded bit stream to generate a second encoded bit stream at a second, lower data rate; and an output for providing the second encoded bit stream at the second data rate.

19. The communication device of claim 18, wherein the least important bits comprise data bits representing very high frequency signals.

20. The communication device of claim 18, wherein the least important bits comprise bits unnecessary to speech recognition.

21. A vocoder, comprising:

an input for receiving a digitized voice data stream;

circuitry for encoding the digitized voice data stream to provide a first encoded bit stream at a first data rate;

a vector quantizer for compressing the first encoded bit stream at the first data rate to produce a second encoded bit stream at a second data rate lower than the first data rate to increase a link margin associated with the vocoder; and an output for providing the second encoded bit stream at the second data rate.

22. The communication device of claim 21, wherein the vector quantizer is responsive to an external control signal.

23. A vocoder, comprising:

an input for receiving a digitized voice data stream;

first vocoder circuitry for encoding the digitized data stream at a first data rate to generate a first encoded bit stream;

second vocoder circuitry for encoding the digitized data stream at a second data rate to generate a second encoded bit stream;

circuitry for increasing a link margin associated with the vocoder by selecting the first or the second vocoder circuitry providing a lowest data rate to generate an encoded bit stream having the lowest data rate; and an output for providing the encoded bit stream at the lower data rate.

24. The communications device of claim 23, wherein the circuitry for selectively utilizing comprises:

a selector connected to receive both the first encoded bit stream at the first data rate and the second encoded bit stream at the second data rate for selecting the encoded bit stream having the lowest data rate.

25. The communications device of claim 23, wherein the circuitry for selectively utilizing comprises a selector connected to receive the digitized data stream and selectively provide the received digitized data stream to the vocoder circuitry providing a lowest data rate.

26. The communications device of claim 23, wherein the circuitry for selectively utilizing comprises means connected between the first and second vocoder circuitry for selectively coupling the received digitized data stream to the vocoder circuitry providing the lowest data rate.

* * * * *